March 6, 1962  M. B. SCHAUB  3,023,734
SMALL ANIMAL RESTRAINING STOCK
Filed Feb. 25, 1960  5 Sheets-Sheet 1
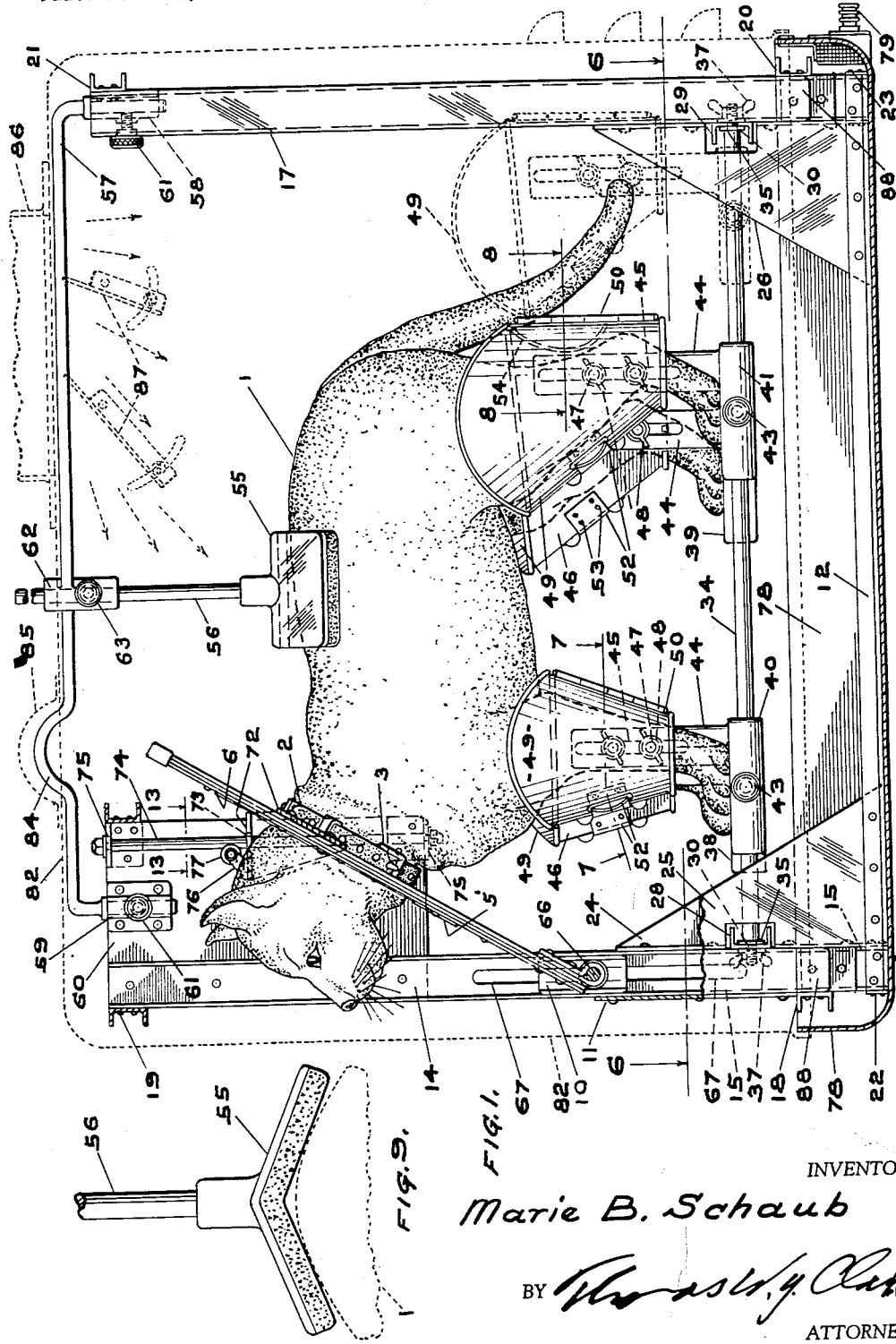
INVENTOR
Marie B. Schaub
BY
ATTORNEY

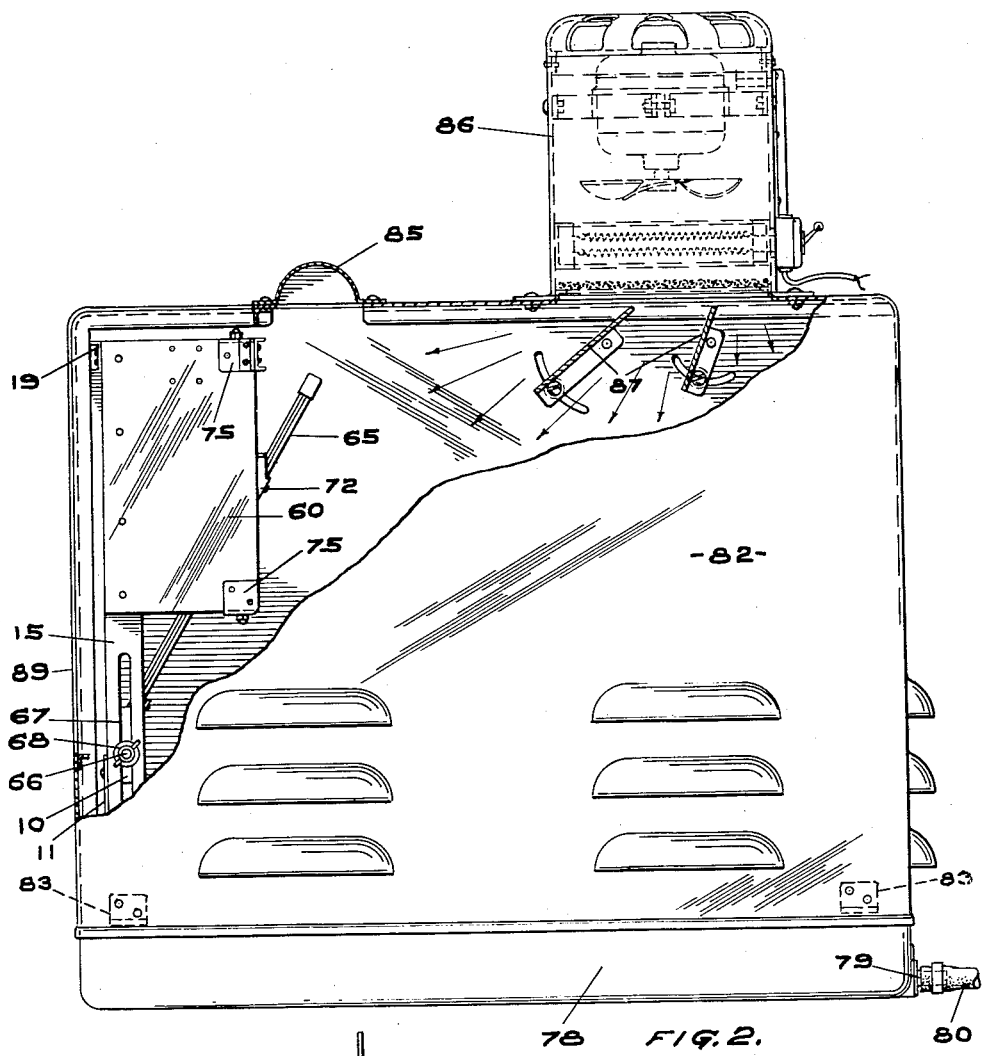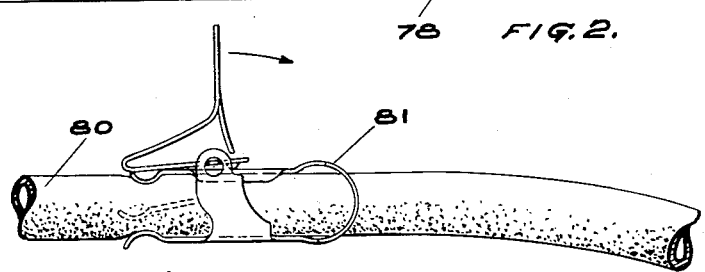

March 6, 1962  M. B. SCHAUB  3,023,734
SMALL ANIMAL RESTRAINING STOCK
Filed Feb. 25, 1960  5 Sheets-Sheet 3

INVENTOR
Marie B. Schaub
BY
ATTORNEY

March 6, 1962 M. B. SCHAUB 3,023,734
SMALL ANIMAL RESTRAINING STOCK
Filed Feb. 25, 1960 5 Sheets-Sheet 4
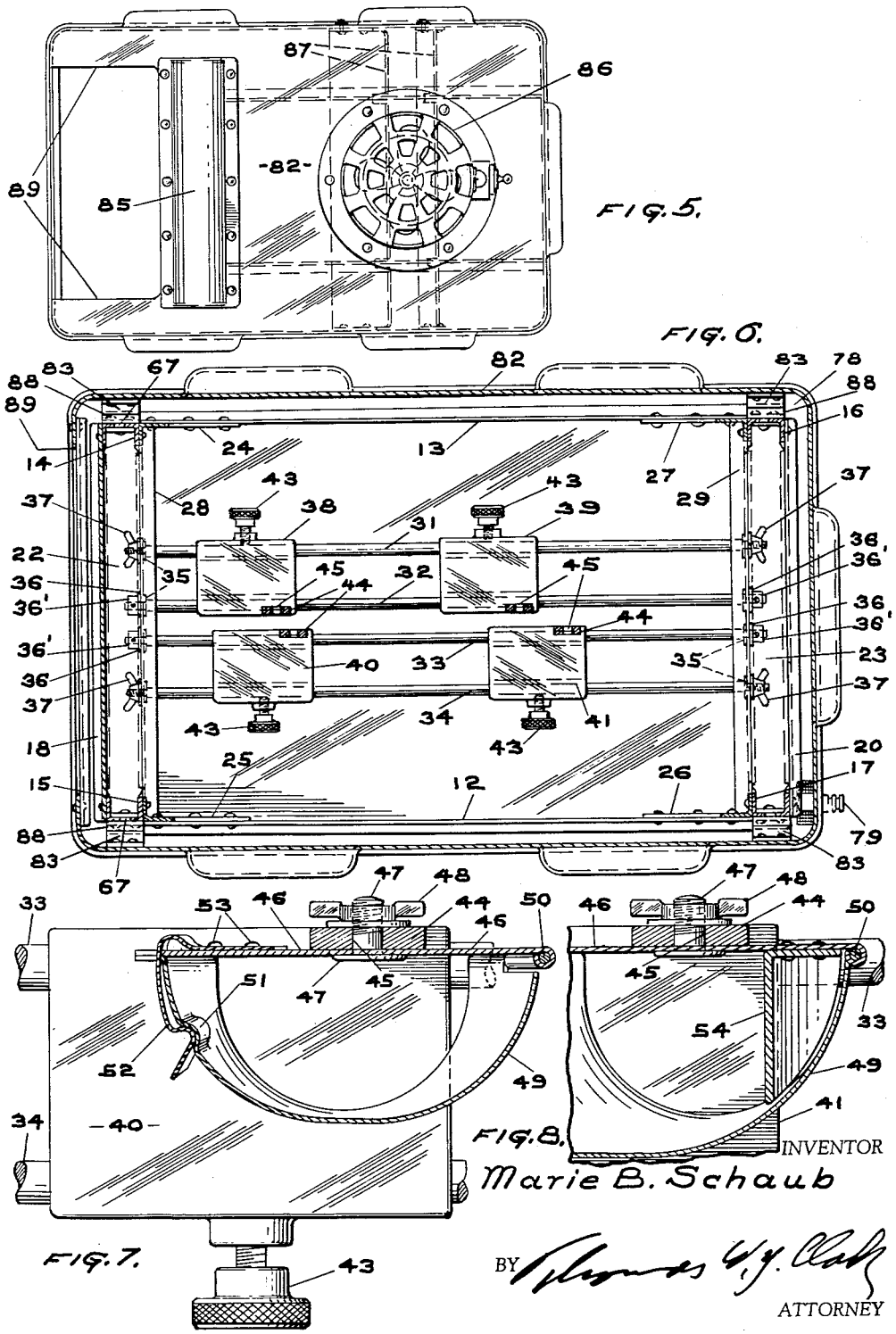
INVENTOR
Marie B. Schaub
BY
ATTORNEY March 6, 1962   M. B. SCHAUB   3,023,734
SMALL ANIMAL RESTRAINING STOCK
Filed Feb. 25, 1960   5 Sheets-Sheet 5
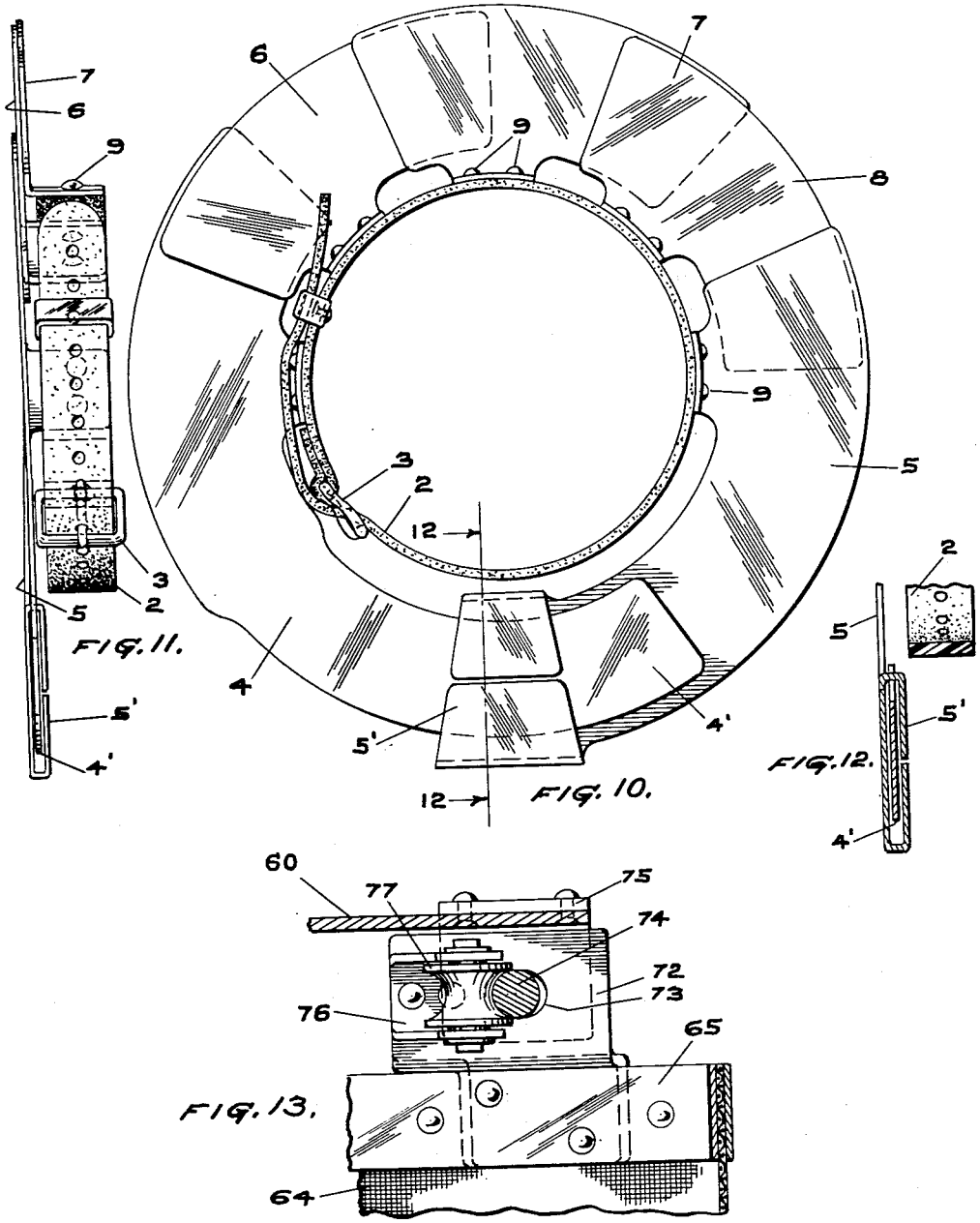
INVENTOR
Marie B Schaub
BY
ATTORNEY

# United States Patent Office 3,023,734
Patented Mar. 6, 1962

3,023,734
SMALL ANIMAL RESTRAINING STOCK
Marie B. Schaub, 3778 Bonview Ave., Baltimore, Md.
Filed Feb. 25, 1960, Ser. No. 11,046
3 Claims. (Cl. 119—99)

This invention relates to improvements in an animal tender and it is primarily directed to a mechanism for holding an animal such as a cat or dog in a position in which it will suffer no harm but also in which it cannot harm an attendant seeking either to bathe or treat it.

It has proved most difficult to hold a small domestic animal such as a cat without harming the animal and while treating it either for general treatment or for local injuries or infestations. After animals have been bathed, which they sometimes will submit to, they have most often been allowed to go free to dry but such free running often gets them ready for another bath or at times they catch cold and it was the loss of a pet in such a manner that was the genesis of the present invention.

Among the objects of this invention is to hold the animal from springing and to permit attention to its legs and feet separately and to hold its head away from the hands of an attendant during this process while at the same time holding the animal in a restrained position which will not injure it.

Another object of the invention is to make the apparatus adjustable so that it may be used for animals of various sizes, of different length as well as height.

Another object of the invention is to provide a casing around the whole apparatus, but with the head of the animal outside so that the bathing or gaseous disinfecting may be done in the enclosure and also the drying may be done in the enclosure as may be required.

Other objects and advantages of the invention will be apparent from the following description and the accompanying drawing forming a part hereof and in which:

FIGURE 1 is a side elevation of the apparatus showing the enclosure in dotted lines.

FIGURE 2 is a side elevational view of the complete device with the enclosure partially broken away.

FIGURE 3 is a continuation of the drain from the right of FIGURE 2.

FIGURE 5 is a top plan view of the invention as shown in FIGURE 2 on a reduced scale.

FIGURE 6 is a sectional view on line 6—6 of FIGURE 1, on a scale slightly reduced from that of FIGURE 1.

FIGURE 7 is a sectional view on line 7—7 of FIGURE 1, on an enlarged scale.

FIGURE 8 is a sectional view on line 8—8 of FIGURE 1, also on an enlarged scale.

FIGURE 9 is an elevational view of the back holder of FIGURE 1.

FIGURE 10 is a rear elevational view of the flanged collar.

FIGURE 11 is a side elevational view of the collar from the left of FIGURE 10.

FIGURE 12 is a sectional view on line 12—12 of FIGURE 10.

FIGURE 13 is a sectional view on line 13—13 of FIGURE 1 on an enlarged scale.

In the drawing similar numerals refer to similar parts throughout the several views.

Figure 4:
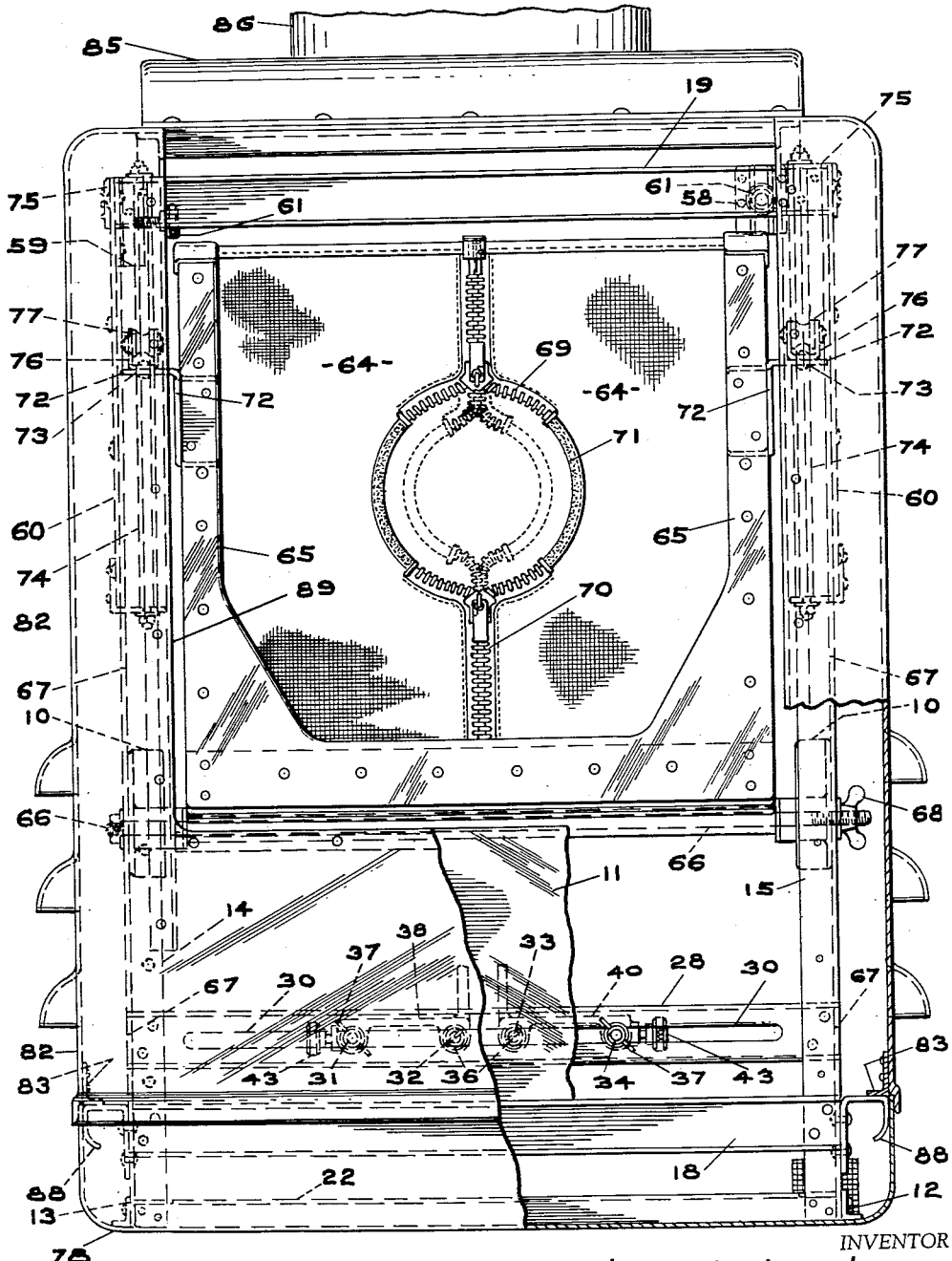
FIGURE 4 is a front elevational view of the apparatus with the enclosure partly broken away.

The animal shown as a cat 1 first preferably has the flanged collar 2 buckled securely around its neck by buckle 3. This collar has sectional flanges 4, 5, 6, 7 and 8 attached thereto by rivets 9. The longer flanges 4 and 5 are threaded together with the end 4' sliding into the sleeve 5' and these flanges 4 and 5 slightly overlap the adjacent flanges 6 and 8 as these flanges slightly overlap flange 7, so that pressure exerted on the collar and resisted by the flanges will be evenly distributed on the animal's head. The flanges leave the collar flexible.

The tender has a frame construction consisting of horizontal angles 12 and 13 at the base attached to the four channel iron uprights 14, 15, 16 and 17. The uprights are joined at their ends by transverse channels 18, 19, 20 and 21 and in addition at the bottom by bars 22 and 23. Angular plates 24, 25, 26 and 27 are riveted to angles 12 and 13 at their lower edges and the vertical channels 14, 15, 17 and 16 respectively at their outer vertical edges to give rigidity to the uprights.

The upright channels likewise have channels 28 and 29 extending across the front and rear of the tender and spaced from the bottom which are slotted as shown at 30 in FIGURE 4 and which carry therein rods 31, 32, 33 and 34. All the rods have their ends cut to a smaller diameter to receive thereon washers 35 and the rod ends fit within the slots 30 in the channels 28 and 29 and the washers prevent their lengthwise movement. The adjacent rods 32 and 33 have thereon washers 36 and collars 36' pinned to their outer ends to hold them securely within their slots and to permit their sliding adjustment therein. The outer rods 31 and 34 have winged nuts 37 thereon at each end to permit their adjustment within the slots 30. Each pair of adjacent rods 31 and 32 and 33 and 34 have sliding thereon two foot supports 38, 39, 40 and 41 through openings in the supports which may each be permanently secured to their respective pairs of rods by set screws 43. These fastened supports may be adjusted as shown in FIGURE 6 to the proper position to hold the animal's feet and they each have thereon uprights 44 which are slotted as shown at 45 to hold the back 46 of a leg restrainer for the animal. These backs 46 each have two bolts 47 therein with winged nuts 48 thereon to vertically support the back of the leg restrainer in any desired vertical position.

The leg restrainers consist of the backs 46 and the curved fronts 49 on their forward surfaces hinged at 50 and having dents 51 therein to connect therein the latch 52, resiliently held on backs 46 by the rivets 53. As shown in FIGURE 1 the curved outer section of the leg restrainer may be opened and moved backward so that as shown in this figure the left rear leg of the cat would be free for treatment or cleansing or to have its claws cut. The outer sections of the leg restrainers are curved upward while the back sections 46 extend horizontally which permits the restrainers, if need be, to be raised to the crotch of the animal's leg to completely prevent a springing use of the legs. The rear restrainers likewise have an additional projection 54 best shown in FIGURE 1 which extends above the lower joint of the animal's legs to prevent their use to spring. The restrainers have beaded edges at their tops and bottoms to avoid injury to the animal. Preferably, the restrainers allow the feet or paws of the animal to project from their bottom edges to make it more difficult for the animal to withdraw its feet through the restrainers.

A back holder 55 is mounted on a rod 56 which is vertically adjustable on the diagonally extending rod 57 which is supported in sockets 58 on channel 21 and 59 on the plate 60 supported by channel 14. The rod 57 is held within the respective sockets by thumb screws 61. Sleeve 62 holding rod 56 is preferably welded to the rod 57. Rod 56 may be adjusted in the sleeve 62 by the thumb screw 63. Rod 57 is removed before the cover, to be described, is placed over the tender.

A head guard of cloth such as light canvas 64 is riveted in frame 65 at its outer sides and lower edge and this frame is hingedly affixed to rod 66 mounted in crossheads 10 and which is vertically slidable in slots 67 in channels 14 and 15 and affixed therein vertically by wing nut 68. The head guard 64 has zippers 69 and 70 above and below the animal's head respectively, with center opening 71, which fits around the band of the collar 2 lightly and the opening 71 is large enough to fit easily around the animal's neck but too small to permit the flanges of the collar 2 to pass therethrough. Zipper 69 is completely opened and guard 64 folded back when the animal's head is placed in or removed from the opening 71. Both zippers are of the locking type, to hold them in fixed position. The frame 65 has angle brackets 72 projecting from its sides which have openings 73 therein through which pass rods 74 mounted at their tops and bottoms on brackets 75 on plates 60 on channels 14 and 15 at the sides and front of the tender. The angle brackets 72 also have brackets 76 riveted thereto carrying pulleys 77 which ride on the rods 74. This allows for rapid vertical adjustment of the head guard 64 without binding because of the pulley and forward movement of the head guard is prevented by the hold brackets 72 riding on the rods 74. Shield 11 on channels 14 and 15 closes the front of the tender below guard 64.

The tender above described is intended to rest in the tray or container 78 which holds either the water or the treatment solution for the animal and it has drain 79 and attached hose 80 with cut-off valve 81 thereon for emptying it. An enclosure or cover 82 for the tender fits thereover and over the tray 78 and has corner brackets 83 resting on corner brackets 88 on the uprights of the tender to support the cover. These latter brackets also space the tender in tray 78. Rod 57 as well as the cover has an upwardly extending bulge at 84 and 85 respectively to make room for the extreme vertical elevation for the head guard 64. The cover 82 likewise has thereon a dryer 86 and adjustable directional vanes 87 to direct heat from the dryer over the animal as may be desired. Cover 82 is open at 89 to allow the animal's head to project in the recess.

It will be apparent from the above description that upon first collaring the animal and placing its legs in the leg restrainers and then its head in the head guard and affixing the zippers that movement of the animal is almost completely prevented and if there should be a tendency to spring, the back holder 55 may be positioned which will prevent any further such tendency. The animal may then be washed or treated over the body and one leg at a time may be manipulated as needed and thereafter the animal may be dried by means of the dryer described. The head of the animal being held firmly may be cleansed and treated as may be needed.

Many changes may be made in the apparatus described without departing from the invention as set forth in the claims.

What is claimed as new and is desired to be secured by Letters Patent is:

1. A restraint type animal tender stock comprising an open rectangular frame having corner uprights, pairs of horizontal parallel rods carried thereby, each pair mounting lengthwise adjustable feet bearing platforms, spaced above the bottom of the uprights, loosely fitting vertically adjustable funnel shaped leg restrainers mounted on each foot platform and extending upwardly whereby an animal is held up and restrained against a downward squat preparatory to springing and collar means on the frame forward of the platforms to restrain movement of an animal within the frame.

2. The tender of claim 1 including a flexible shield closable about the neck of an animal and mounted in one end of the frame and extending to adjacent both sides thereof, forward of the platforms, the shield being openable adjacent its center to receive the head of an animal therethrough and the collar means including a radially flexible flange extending outwardly thereon adapted for placement and retention outside the shield upon the closure of the shield.

3. The tender of claim 1 including a flexible shield closable about the neck of an animal and mounted in one end of the frame and extending to adjacent the sides thereof, forward of the platforms, the shield being openable adjacent its center to receive the head of an animal therethrough and the collar means including a radially flexible flange extending outwardly thereon adapted for placement and retention outside the shield upon the closure of the shield, and cover means for the frame enclosing the same at the sides and rear, the shield exposing the head of an animal constituting the forward end of the enclosure.

References Cited in the file of this patent

UNITED STATES PATENTS

| | | |
|---|---|---|
| 81,210 | Reid | Aug. 18, 1868 |
| 1,235,483 | Johnston | July 31, 1917 |
| 1,788,924 | Marrinan et al. | Jan. 13, 1931 |
| 1,879,915 | Smoot | Sept. 27, 1932 |
| 2,000,122 | Cameron | May 7, 1935 |
| 2,187,337 | Wang | Jan. 16, 1940 |
| 2,660,982 | Linton | Dec. 1, 1953 |
| 2,661,865 | Wendt | Dec. 8, 1953 |
| 2,804,845 | Plumley et al. | Sept. 3, 1957 |